Feb. 9, 1965 EIZABURO MURAKAMI 3,168,901
LIQUID PRESSURE AUTOMATIC REGULATION VALVE
Filed Jan. 22, 1963 4 Sheets-Sheet 2

EIZABURO MURAKAMI
INVENTOR.

BY Wenderoth, Lind
and Ponack, attorneys

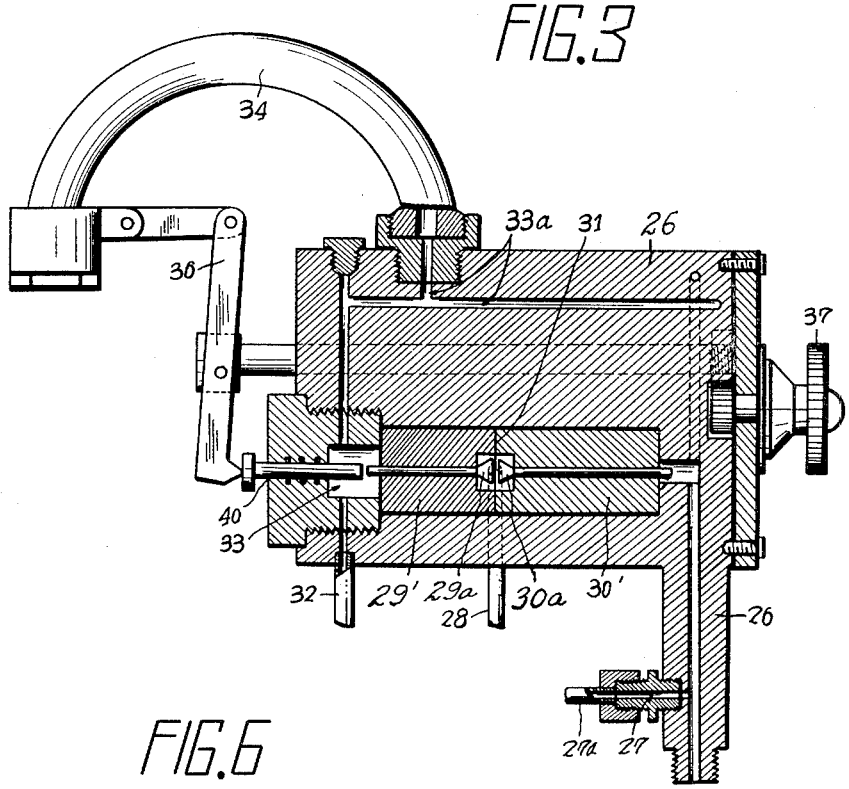
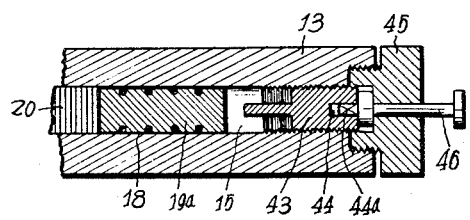

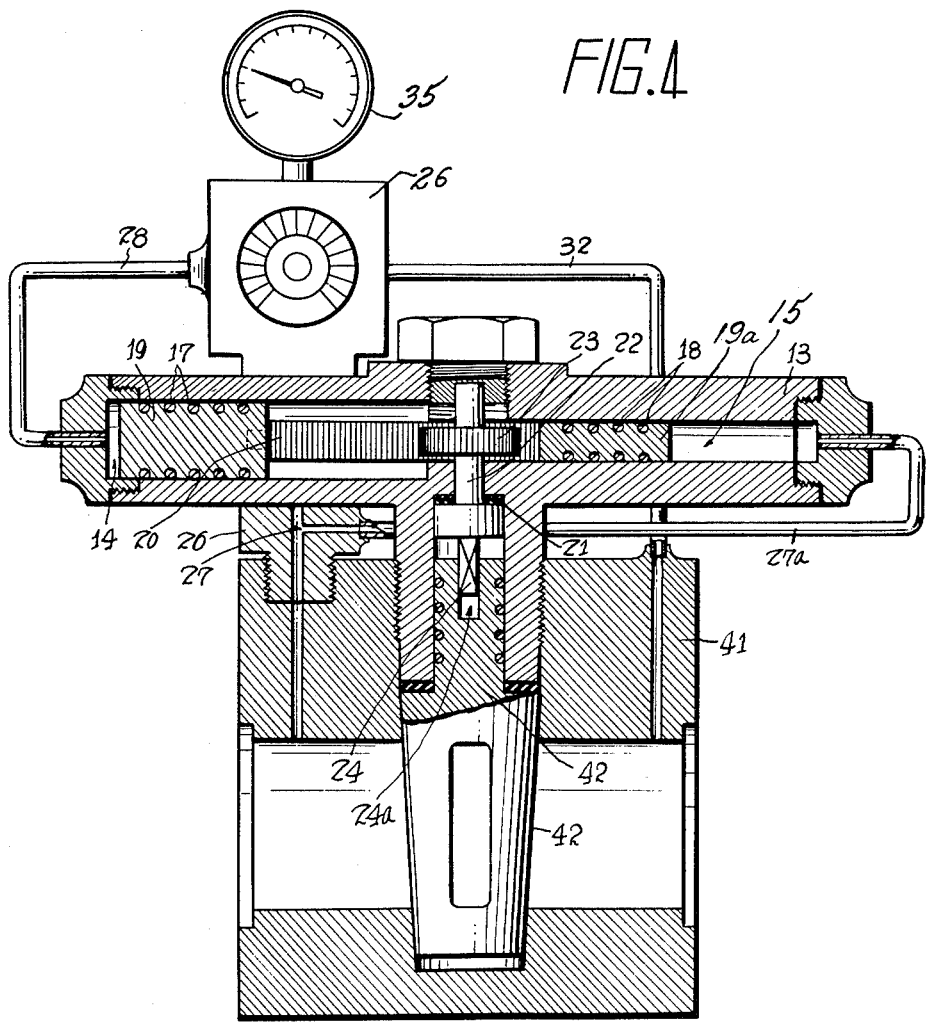

United States Patent Office 3,168,901
Patented Feb. 9, 1965

3,168,901
LIQUID PRESSURE AUTOMATIC
REGULATION VALVE
Eizaburo Murakami, 619-19 Osaki Honcho 3-chome,
Shinagawa-ku, Tokyo, Japan
Filed Jan. 22, 1963, Ser. No. 253,094
Claims priority, application Japan, Feb. 3, 1962, 37/4,054
3 Claims. (Cl. 137—492)

This invention relates to a valve, and more particularly it relates to a valve for automatically regulating liquid pressure.

It is an object of this invention to provide a regulating valve adapted to regulate liquid pressure such that the valve does not pass fluid at any pressure other than a predetermined pressure, and which is adapted to operate accurately without positive or negative pressure errors, so that the valve can be widely used.

To this end, the valve for automatically regulating liquid pressure according to the invention comprises a driving shaft adapted to open and close the valve opening by rotating a valve body, a pinion provided on said driving shaft, a rack engaged with said pinion and being supplied directly from the valve with the main valve inlet pressure on one side thereof through a small-diameter piston and being supplied from an auxiliary valve with the main valve inlet pressure on the other side thereof through a large-diameter piston so that said rack is adapted to effect reciprocating movement to rotate the pinion, said auxiliary valve having two control valves provided in opposed relationship to each other, a communicating chamber provided between the two control valves and one control valve being in communication with the main valve inlet side, the main valve discharge side being in communication with the other of said two control valves, two control valve rods adapted to alternately open and close the respective control valves, a Bourdon tube coupled to the main valve and having one end of a lever connected to the free end thereof, the other end of the lever being disposed in opposed relationship with the valve rod of one of said two control valves.

With the valve according to the invention, when the inlet pressure is to be regulated, the valve seats of the two control valves are outwardly opposed to each other, and said Bourdon tube is operated when the inlet pressure becomes higher than a predetermined value, so that the main valve inlet pressure is supplied to said large-diameter piston because the Bourdon tube lever presses on the control valves, the inlet and outlet ports of the main valve are placed in communication with each other by the rotation of the pinion and, in turn, the driving shaft. The Bourdon tube is returned to its original condition when the inlet pressure becomes lower than said predetermined value, so that one of the control valves is closed while the other one of the control valves is opened for discharging the pressure supplied to said large-diameter piston to the main valve discharge side and for pressing said small-diameter piston by the inlet pressure in the main valve in order to move said rack in the direction opposite to that previously described.

On the other hand, when the main valve discharge pressure is regulated, the said two control valves have valve seats disposed in opposed relationship to each other, and when said Bourdon tube is operated when the main valve discharge pressure becomes equal to said predetermined value, the valve seat of one of the control valves is opened while the valve seat of the other one of the control valves is closed under the action of the Bourdon tube lever, thereby blocking the main valve inlet pressure supplied to the large-diameter piston and letting the pressure escape to the discharge side. The rack is moved by means of the inlet side pressure normally applied to the small-diameter piston so that the communication between the inlet and outlet ports of the main valve is blocked by rotating the pinion and, in turn, the driving shaft in the opposite direction. The Bourdon tube returns to the normal condition when the discharge pressure becomes lower than said predetermined value, so that the valve seat of one of the control valves is closed while the valve seat of the other one of the control valves is opened, the main valve inlet pressure is applied to the large-diameter piston, thereby moving the rack in the direction opposite to that previously described so that the inlet and outlet ports of the main valve are again placed in communication with each other by rotation of the driving shaft.

Other objects and advantages of this invention will become apparent to those skilled in the art from the following detailed description made in conjunction with the accompanying drawings, in which:

FIG. 3 is an enlarged sectional view of control valves for the main valve of FIG. 1 for automatically regulating the pressure when the main valve outlet pressure should be regulated;

FIG. 4 is a longitudinal sectional view of a modified main valve for automatically regulating low pressure;

FIG. 6 is a longitudinal sectional view of a device for regulating the amount of movement of a rack.

Figure 1:
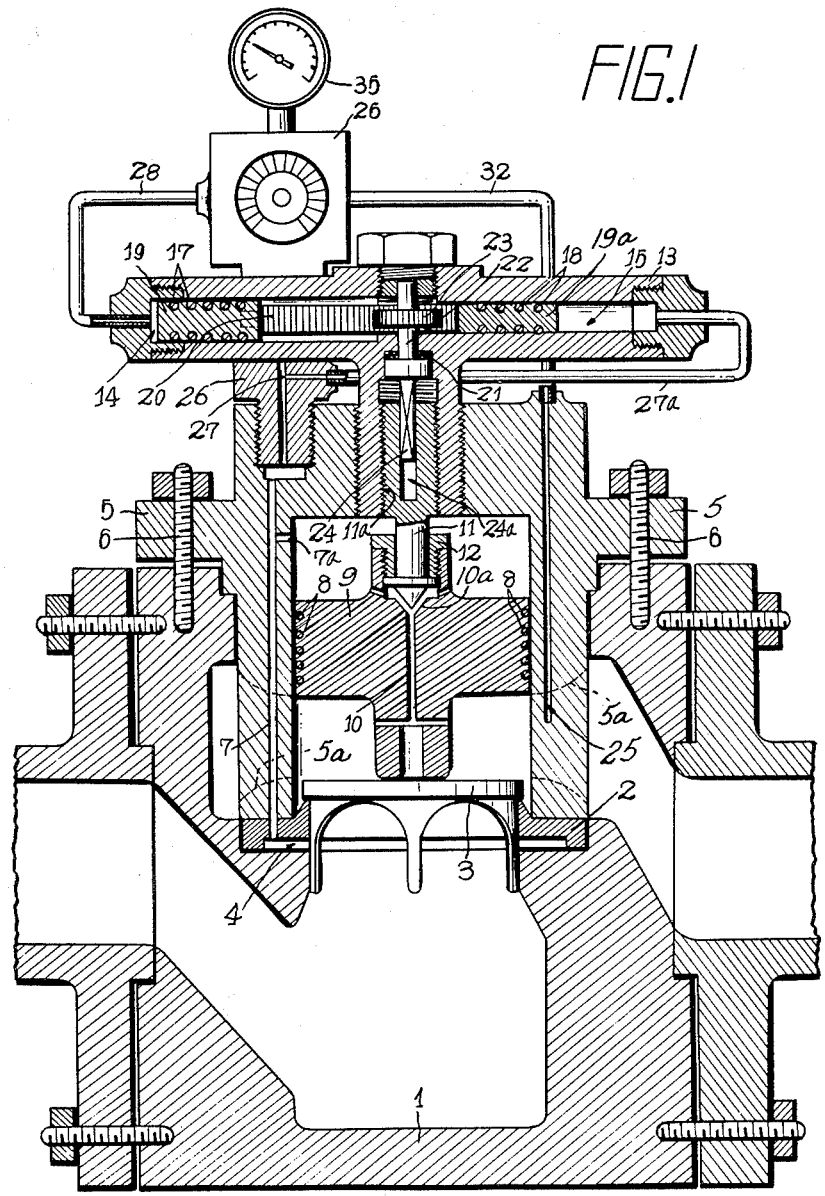
FIG. 1 is a longitudinal sectional view of a main valve for automatically regulating liquid pressure in accordance with this invention.
Figure 2:
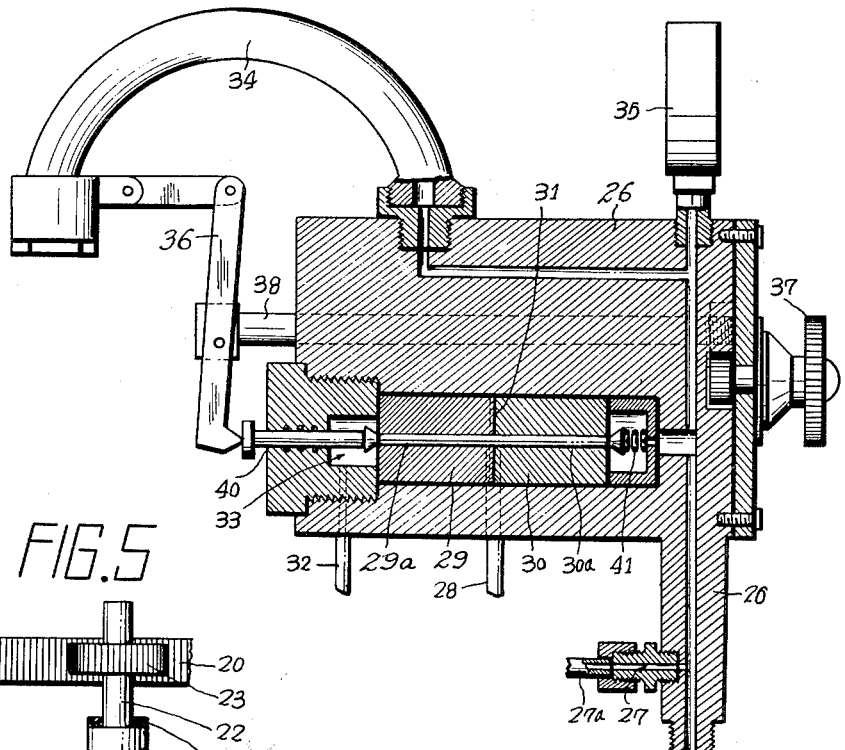
FIG. 2 is an enlarged sectional view of control valves for the main valve of FIG. 1 for automatically regulating the pressure when the main valve inlet pressure is to be regulated.

Referring to FIG. 1 and FIG. 2, valve 3 is seated on valve seat 2 of main valve 1 and a recess 4 is provided in the lower portion of valve seat 2. Said recess is connected to vertical bore 7 in cylinder 5 which is inserted into the main valve and secured by bolts. Cylinder 5 has a piston 9 therein around the periphery of which are fitted O-rings 8. The lower end of said piston 9 presses on the face of valve 3. A bore 10 is provided through piston 9 and at the upper end of said bore is a valve seat 10a. A needle valve 11 seats on valve seat 10a and is retained in the upper end of piston 9 by a threaded collar 12 in such manner that the edge of said needle valve can move up and down about 0.5 mm. Into a threaded bore in the upper part of the cylinder 5 is threaded a downwardly extending hollow extension of driving chamber 13, and threaded into the extension is a threaded portion 11a mounted on the end of said needle valve 11 so that the needle valve 11 can move up and down when it is rotated. In the left side of said driving chamber 13, is a cylinder 14 of a large diameter and in the right side is a cylinder 15 of a small diameter, and opposite ends of rack 20 extend into these cylinders respectively. O-rings 17 and 18 on pistons 19 and 19a slidably position the pistons 19 and 19a in cylinders 14 and 15 respectively, and the pistons are connected with the ends of said rack. A packing 21, for example made of polytetrafluoroethylene, has a driving shaft 22 extending through it into the driving chamber 13 in such a manner that it will only rotate. On the upper end of said driving shaft, a pinion 23, which is engaged with the aforementioned rack 20, is mounted. A square portion 24 at the lower end of said driving shaft is engaged in a square shape hole 24a in said needle valve 11, and, when said pinion 23 is rotated when the rack 20 moves right or left, said needle valve is rotated by said square shape portion 24 and is guided by screw portion 11a and it makes up and down movements and opens and closes the valve formed by needle valve 11 and valve seat 10a of the piston 9. The vertical bore 7 provided in cylinder 5 and the chamber of cylinder 5 provided above the upper end of the piston 9 are connected by a branch opening 7a, and the fluid outlet port of the main valve 1 (discharge side) is connected to the interior of the cylinder 5 through openings 5a in the lower end of cylinder 5 into one of which openings the lower end of the bore 25 opens. The chamber at the right side of the cylinder 15 of a small diameter and an opening 27 in the auxiliary valve 26 which is connected with said vertical bore 7 in the cylinder 15 are connected by tube 27a. The chamber at the left side of the cylinder 14 of a large diameter is, by a tube 28, connected to and in communication with a communication chamber 31 between the two control valves 29 and 30 of the auxiliary valve.

The upper end of the aforementioned opening 25 is connected by tube 32 to the outside chamber 33 of one of the control valves 29 of the auxiliary valve 26; the opening 27 is connected to the Bourdon tube 34 the base end of which is fixed to the auxiliary valve and an inlet pressure manometer 35. To the free end of said Bourdon tube 34 is connected one end of lever 36. A control rod 38 which is moved forward and backward by means of a gear and a screw by rotating a dial 37 provided on the auxiliary valve 26, has the middle portion of the lever 36 pivotally mounted thereon. The other end of said lever 36 is positioned opposite the end of a valve rod urging member 40 which is reciprocal toward and away from the left end of valve rod 29a of the control valve 29. 41 is a spring which urges and holds the valve rod 30a of the control valve 30 from the right side, and, when the Bourdon tube 34 is not operated, the valve seat of the control valve 30 is closed by the valve rod 30a and valve rod 29a is shifted toward the left and away from the valve seat of the control valve 29.

When the main valve inlet pressure becomes higher than a fixed pressure (for example, more than 50 kg./cm.²), the Bourdon tube 34 is actuated and the valve rod urging member 40 is pushed towards the right by the other end of the lever 36. Accordingly, the valve seat of the control valve 29 is closed by the valve rod 29a, and the valve seat of the control valve 30 is opened by the valve rod 30a, against the action of spring 41. Then, the main valve inlet pressure is admitted from tube 28 to the left side of piston 19. Due to the difference between the pressure receiving area of the piston 19 and the pressure receiving area of piston 19a, the rack 20 is moved towards the right, pinion 23 is rotated, needle valve 11 is lifted, piston 9 is pushed up and valve seat 10a is opened. If said valve seat 10a is opened, since the primary pressure which works on the upper face of the piston 9 escapes through the bore 10 to the liquid outlet port (discharge side), valve 3 is pushed up and the inlet liquid under pressure flows from the inlet port toward the outlet port.

If the inlet side pressure becomes lower than a fixed pressure (for example, less than 50 kg./cm.²), since the Bourdon tube 34 returns to the original position and the pressure of lever 36 is not added to the valve rod urging member 40, valve rods 29a and 30a are moved toward the left by the spring 41, the valve seat of the control valve 30 is closed and the valve seat of the control valve 29 is opened. Therefore, since the communication between opening 27 and tube 28 is cut off and the tube 28 and tube 32 are placed in communication, the inlet pressure on the left side of piston 19 is discharged to the liquid outlet opening of the main valve. Rack 20 moves toward the left under the effect of the inlet side pressure which is added to the right side of piston 19a from tube 27a and it rotates pinion 23 in the opposite direction from the case described above. The needle valve 11 is rotated by the square shape portion 24 in the opposite direction from the case described above and the needle valve 11 is seated on valve seat 10a. If the valve 11 is seated on seat 10a, the piston 9 descends under the effect of the inlet which enters through the branch opening 7a into the upper chamber of cylinder 5, and, since the rack 20 continues to move toward the left during said descending operation, no gap will be generated between the needle valve 11 and the valve seat 10a. Therefore, finally, the valve seat 2 is closed by valve 3, and the inlet pressure fluid in the main valve will not flow into the fluid outlet port (the discharge side). Since the opening 27 of the auxiliary valve and tube 32 are not in communication, the inlet pressure fluid will not escape from the auxiliary valve to the discharge port of the main valve.

Next, with respect to FIG. 1 and FIG. 3 the embodiment in which the discharge pressure is regulated is explained below. Identical parts are identified by the same reference numerals throughout the several views. In the control valve 29' on one side and the control valve 30' on the other side, the valve rods 29a and 30a are arranged in a direction opposite to that in FIG. 2 in such way that the valve seats in the communication chamber 31 are opened or closed. And the opening 27 of the auxiliary valve is connected with the control valve 30'. Communication chamber 31 between the control valves 29' and 30' is connected by tube 28 with the left side of the cylinder 14 in FIG. 1. The outside chamber 33 of the control valve 29' is connected by tube 32 and opening 25 to the outlet port (the discharge side) of the main valve. Also, the Bourdon tube 34 is connected to opening 33a which communicates with the outside chamber 33.

If the discharge pressure attains a fixed pressure (for example, 50 kg./cm.²), the Bourdon tube 34 is actuated and the inlet fluid under pressure runs from tube 28 into the right side of the cylinder 14. Also, if the discharge pressure drops below 50 kg./cm.² even a little, the Bourdon tube 34 returns to its original position, the control valve 29' is closed by the valve rod 29a and the control valve 30' is opened by the valve rod 30a. Therefore, the inlet pressure fluid flows through the tube 28 into the cylinder 14 from the opening 27. Then, the piston 19 moves toward the right and pulls the needle valve 11 up. The inlet fluid under pressure flows from the valve seat 10a of the piston 9 to the outlet port and the piston 9 is lifted up. The valve seat 2 is opened by the inlet fluid under pressure, the force of which is added to the lower face of valve 3 and the fluid inlet port and the outlet port of the main valve are connected. Then, when the pressure in the outlet port (discharge pressure) side attains 50 kg./cm.², the Bourdon tube operates and, in the same way as mentioned above, the control valve 30' is closed by the valve lever 30a, and the pressure fluid in the communication chamber 31 flows into the outside chamber 33, through tube 32 and opening 25 and through the outlet port. By repeating these operations, the valve regulates the discharge.

FIG. 4 shows the application of the control system of this invention as applied to low pressure automatic regulation valves such as two way valve, three way valves, cross valves, etc. A rotary valve 42 is rotatably mounted between the fluid inlet port (inlet pressure side) and the outlet port (discharge pressure side) of low pressure valve main body 41. A square shape opening 24a is provided in the upper end shaft portion 42a of said rotary valve. The driving shaft 22 is provided with pinion 23 and is rotatably mounted in packing 21 made of a material such as polytetrafluoroethylene mounted in said low pressure valve main body 41. By shifting the rack 20 to the right and left as mentioned with respect to FIG. 2 and FIG. 3, the driving shaft 22 is rotated in one direction or the other, and the inlet port and the outlet port are connected or cut off in accordance with the amount of regulation of the inlet pressure (or discharge pressure).

Figure 5:
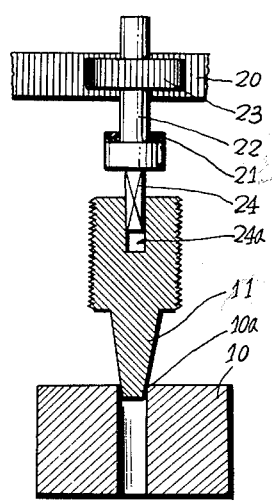
FIG. 5 is a fragmentary view showing a modified form of the main valve.

FIG. 5 shows a modification of the end portion of the needle valve 11, and, in order to control the inlet pressure and the discharge pressure, the pinion 23 is rotated in one direction or the other by a rack 20 and the shaft has the square portion 24 thereon which engages in the square shaped opening 24a to rotate the valve 11 and give it the upward and downward motion due to the threads thereon. The valve seat 10a' of valve 10' is opened and closed and the inlet pressure (or the discharge pressure) is regulated.

FIG. 6 shows a mechanism which regulates a flow rate of the inlet pressure fluid (or the discharge pressure fluid) of the main valve by regulating the amount of movement of the rack 20. An abutment member 43 is screwed into the right end of the cylinder 15 of a small diameter, the tip of said abutment member being opposite the right end of the piston 19a. On the other end of said abutment member 43, a square shaped opening 44 is provided. The regulation knob 46 is rotatably mounted in collar 45 which is screwed into the right end of the driving chamber 13. A square shape portion 44a at the tip of said regulation knob is engaged with the aforementioned square shaped opening 44. When the regulation knob 46 is rotated, the abutment member 43 is advanced or retreated to the right and left and the scope of movement of the piston 19a is controlled. The regulation knob 46 and the screw 45 are graduated so that a flow rate for the inlet pressure (or the discharge pressure side) can be read directly.

By the mechanism of this invention, it is possible to produce valves ranging from large capacity and high pressure valves to small capacity and low pressure valves which can operate with almost no plus or minus error and which have excellent operation characteristics, i.e. it is possible to regulate very closely the lift of the main valve by regulating the movement of the rack, etc.

What is claimed is:

1. A valve for automatically regulating liquid pressure, said valve comprising a valve casing having an inlet and an outlet and a passage therethrough between the inlet and the outlet, a valve seat in said passageway, a main valve body movable toward and away from said seat for blocking the passage, rotatable valve body driving means coupled to said main valve body for moving said main valve body toward and away from said valve seat, a drive shaft coupled to said rotatable valve body driving means, a pinion on said drive shaft, a rack engaged by said pinion, a larger diameter piston-cylinder means at one end of said rack and adapted to engage said rack, a smaller diameter piston-cylinder means at the other end of said rack and adapted to engage said rack, an auxiliary valve having two control valves in opposed relation to each other and having a communicating chamber between them and into which said control valves open, said communicating chamber being connected to said larger diameter piston-cylinder means, means connecting the smaller piston-cylinder means and one end of one control valve to the inlet of said main valve casing, means connecting the one end of the other control valve to the outlet of said main valve casing, a Bourdon tube having one end fixed to the auxiliary valve, lever means connected to the other end of said Bourdon tube, control valve actuating means connected to said lever means, and said Bourdon tube being in communication with said main valve casing on only one side of said main valve body.

2. A valve as claimed in claim 1 in which said Bourdon tube is in communication with the inlet side of said main valve casing and said control valves being adapted to close by movement toward each other and toward said communicating chamber, the said other control valve being directly engaged by said lever means and said one control valve being spring loaded to the closed position and adapted to be opened by said lever means, whereby the inlet pressure can be regulated by said valve.

3. A valve as claimed in claim 1 in which said Bourdon tube is in commuication with the outlet side of said main valve casing and said control valves being adapted to close by movement away from each other, said other control valve being engaged by said lever means and said one control valve being engageable by the other control valve to close said one control valve when said other control valve is opened by said lever means, whereby the outlet pressure can be regulated by said valve.

References Cited in the file of this patent
UNITED STATES PATENTS

| | | |
|---|---|---|
| 560,520 | Morrin et al. | May 19, 1896 |
| 1,938,958 | Goldman | Dec. 12, 1933 |
| 2,149,725 | Canariis | Mar. 7, 1939 |
| 2,840,104 | Shafer | June 24, 1958 |
| 2,998,020 | Charasse | Aug. 29, 1961 |
| 3,042,073 | Murakami | July 3, 1962 |